Figure 1:
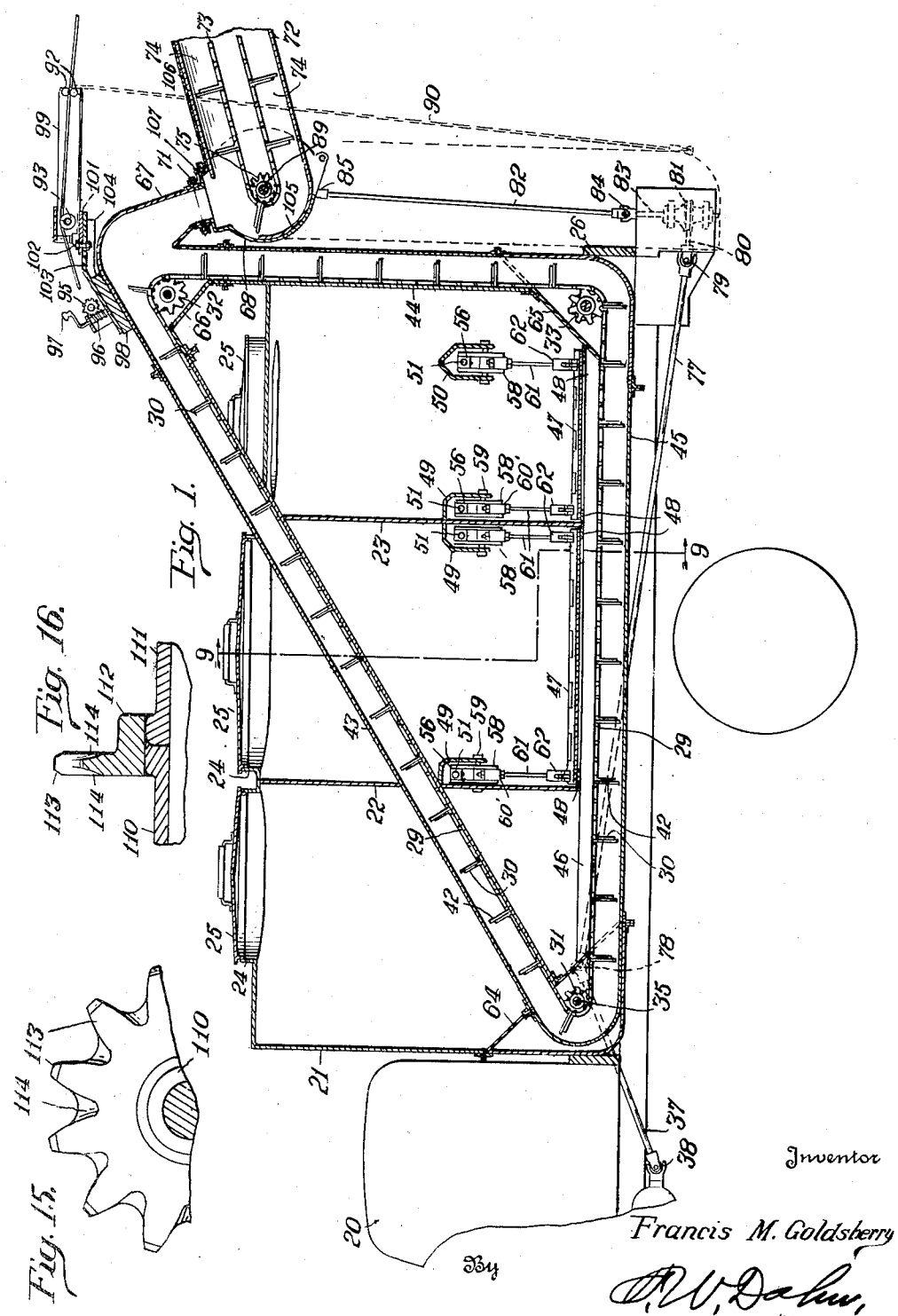

Oct. 30, 1951  F. M. GOLDSBERRY  2,573,193
BULK TANK TRUCK WITH CONVEYER UNLOADER
Filed Feb. 11, 1948  6 Sheets-Sheet 1

Inventor
Francis M. Goldsberry
By
D.W. Dahm,
Attorney

Oct. 30, 1951 — F. M. GOLDSBERRY — 2,573,193
BULK TANK TRUCK WITH CONVEYER UNLOADER
Filed Feb. 11, 1948 — 6 Sheets-Sheet 2

Inventor
Francis M. Goldsberry
By
F. W. Dahm,
Attorney

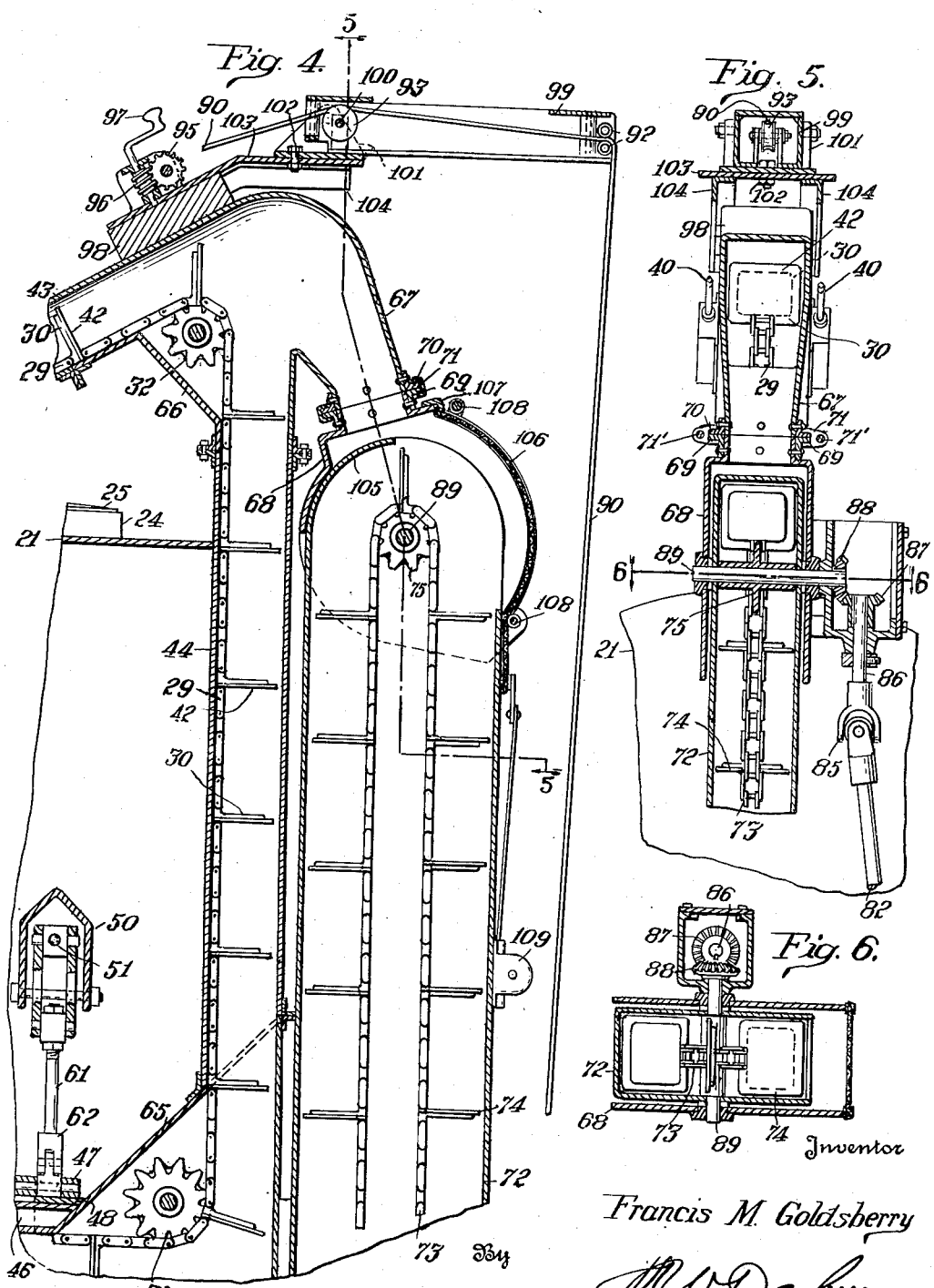

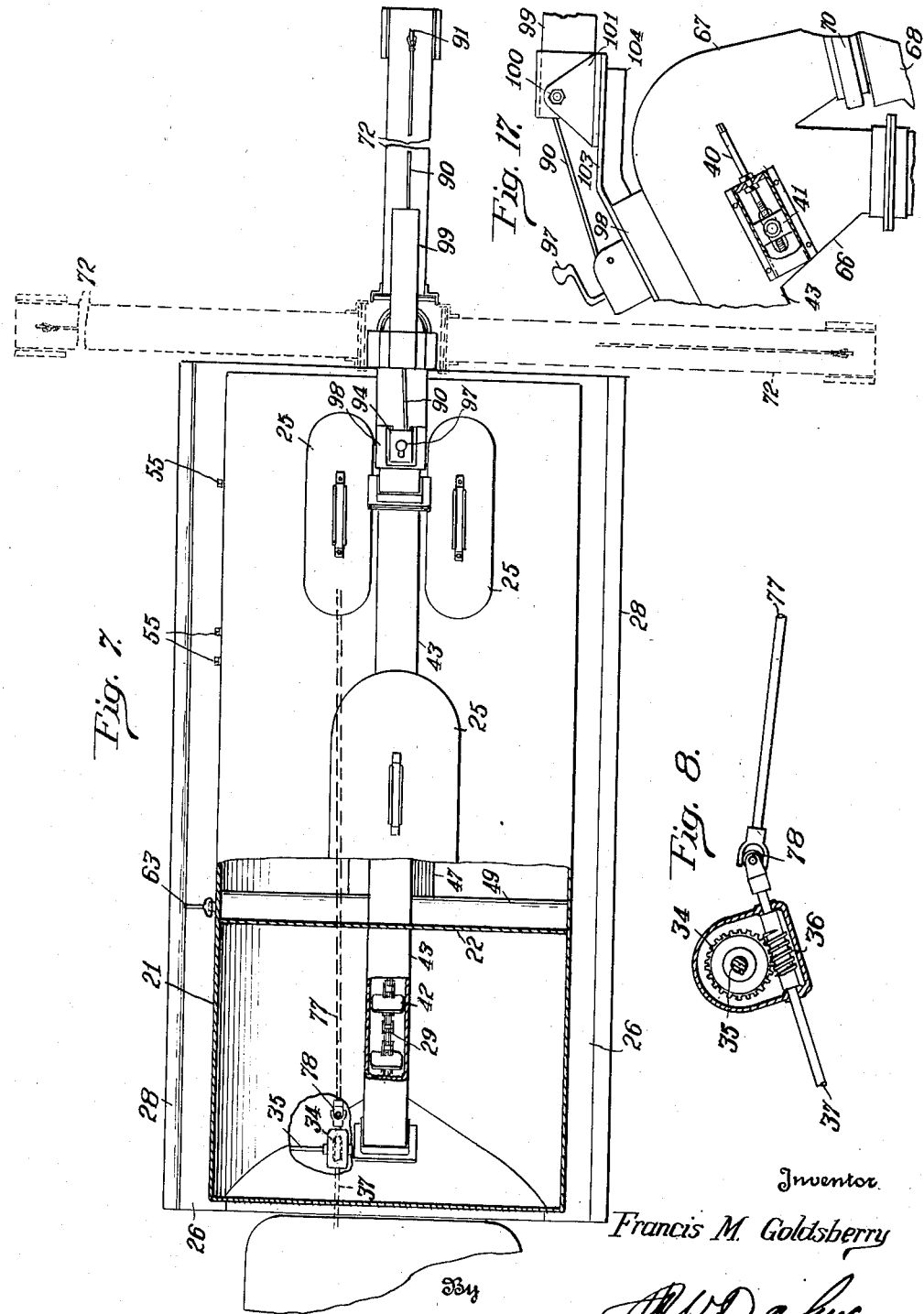

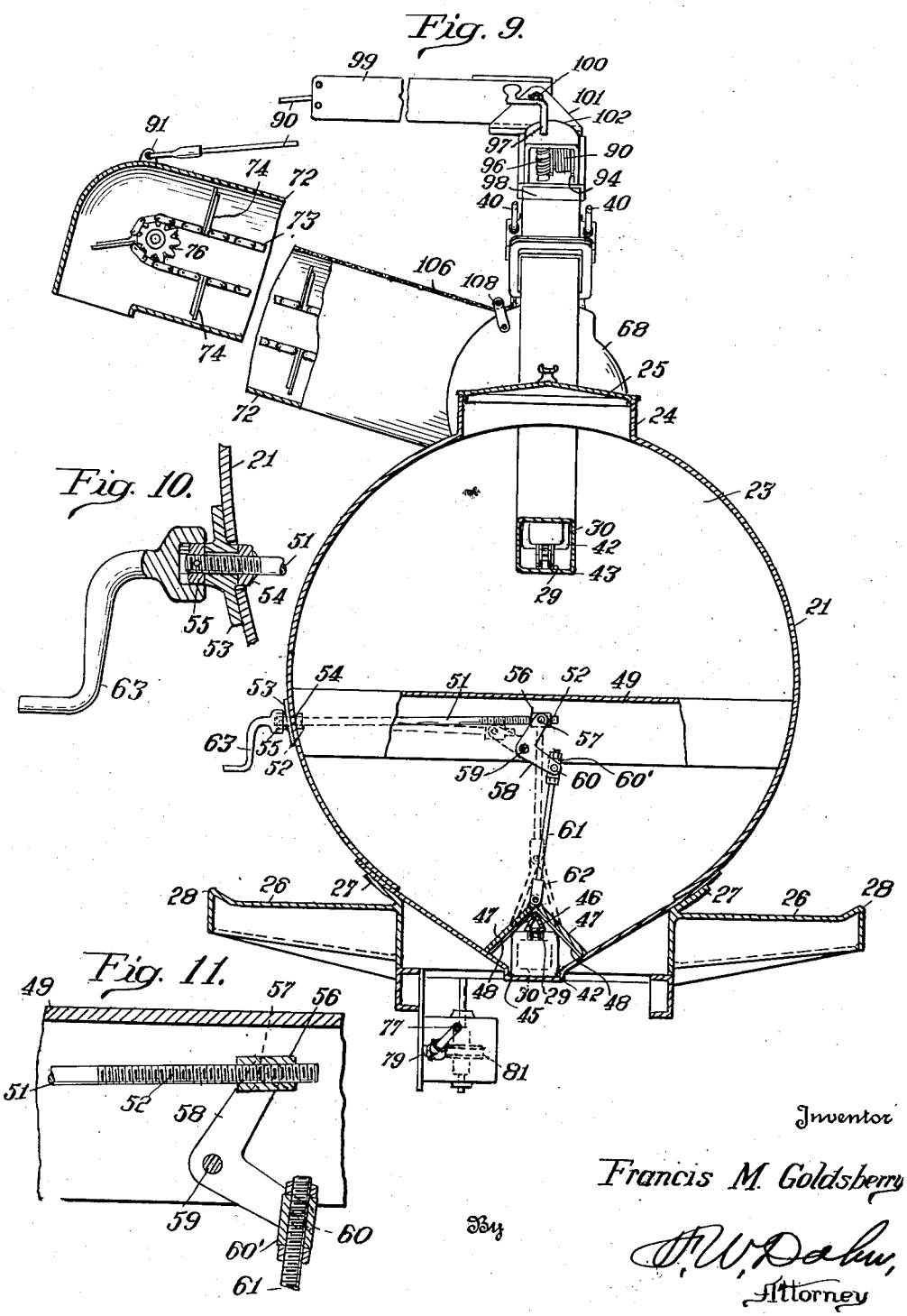

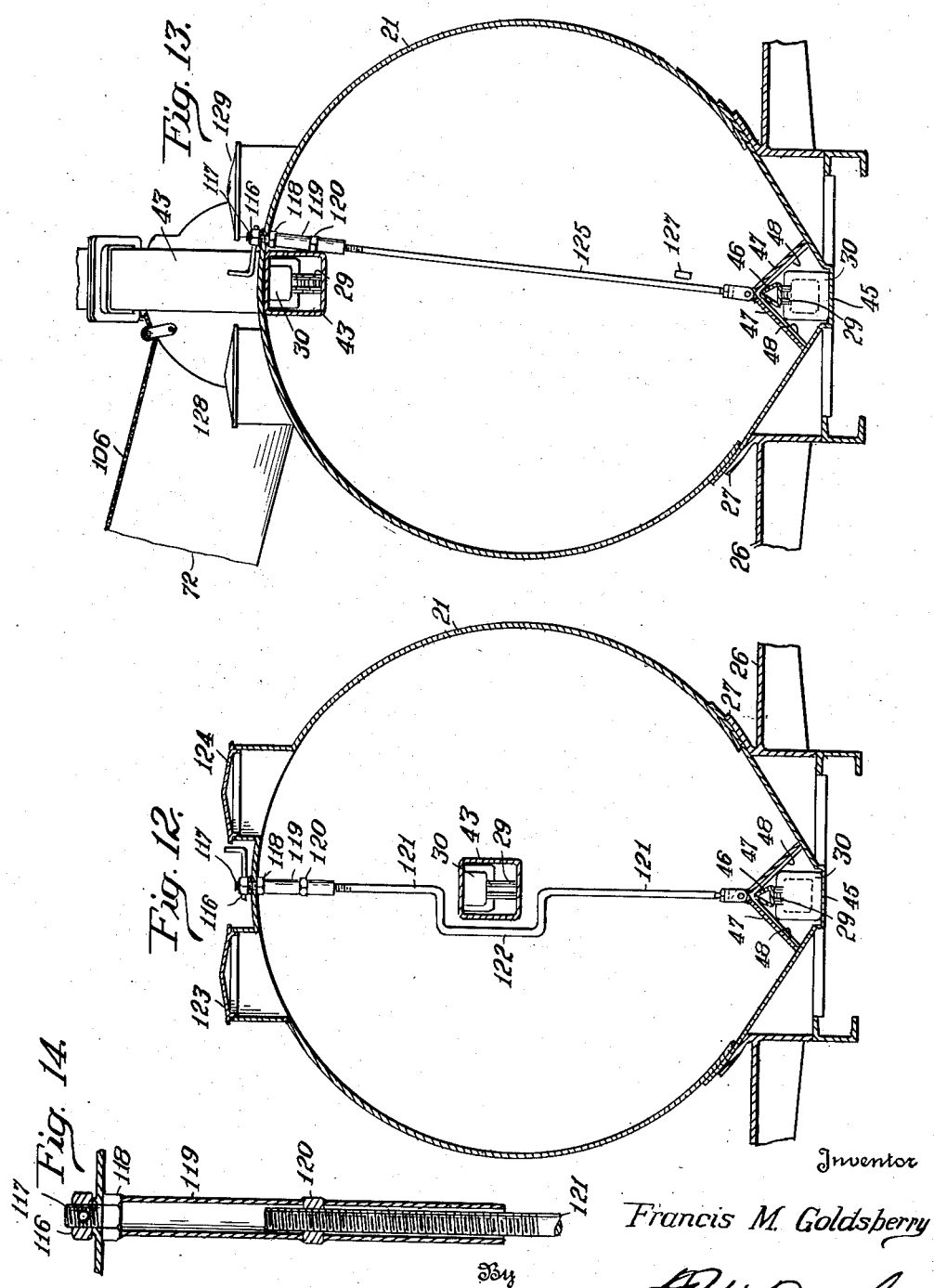

Patented Oct. 30, 1951

2,573,193

UNITED STATES PATENT OFFICE 2,573,193

BULK TANK TRUCK WITH CONVEYER UNLOADER

Francis Mern Goldsberry, Ontario, Calif.

Application February 11, 1948, Serial No. 7,675

20 Claims. (Cl. 214—83.16)

My invention relates to a bulk tank truck, and it is an object of the same to provide improved means intended primarily for hauling such free flowing dry materials as bulk grain and feeds to the ultimate consumer, though the device of my invention is not limited either to use with any particular material, or to any particular method of use, since obviously it may be utilized in various situations and for various purposes. One such mode of use is for hauling grain from a combine or the like to an elevator or to box cars, and it is particularly adapted for loading box cars, since it can load them from the top.

Another object of the invention is to provide a bulk tank truck with several compartments so that several different materials or different grades of material may be transported at the same time, the unloading means being of such character that any compartment may be unloaded independently of the others, except that in the form of the invention at present deemed preferable the foremost compartment must be unloaded first.

Another object is to provide improved gates controlling the unloading of the several compartments, with improved operating means for opening and closing the gates.

Another object is to provide improved means for preventing the material in a compartment from bridging over the outlets at the bottom of the compartments, and so hindering the unloading of their contents.

Another object is to provide improvements in that part of the unloading means consisting of a distributing conveyor movable both laterally and vertically into any one of a multiplicity of discharge positions.

Another object is to provide improved sprockets for use in a device of the character herein disclosed.

Another object is to provide improved means for preventing exit of dust from the discharge conveyor.

Still other objects are to provide improved means for protecting the primary conveyor driving means against contact with the load of material in the truck; to provide improved cleats for the conveyor; to provide improved means for protecting the lower run of the main conveyor against the weight of the fluent material; to provide means for carrying such articles as sacks of grain and feed in such manner as to be readily accessible, as for distribution to customers desiring only small packages of commodities; and still other objects and advantages will appear upon consideration of the subjoined specification and claims and the annexed drawings.

Figure 2:
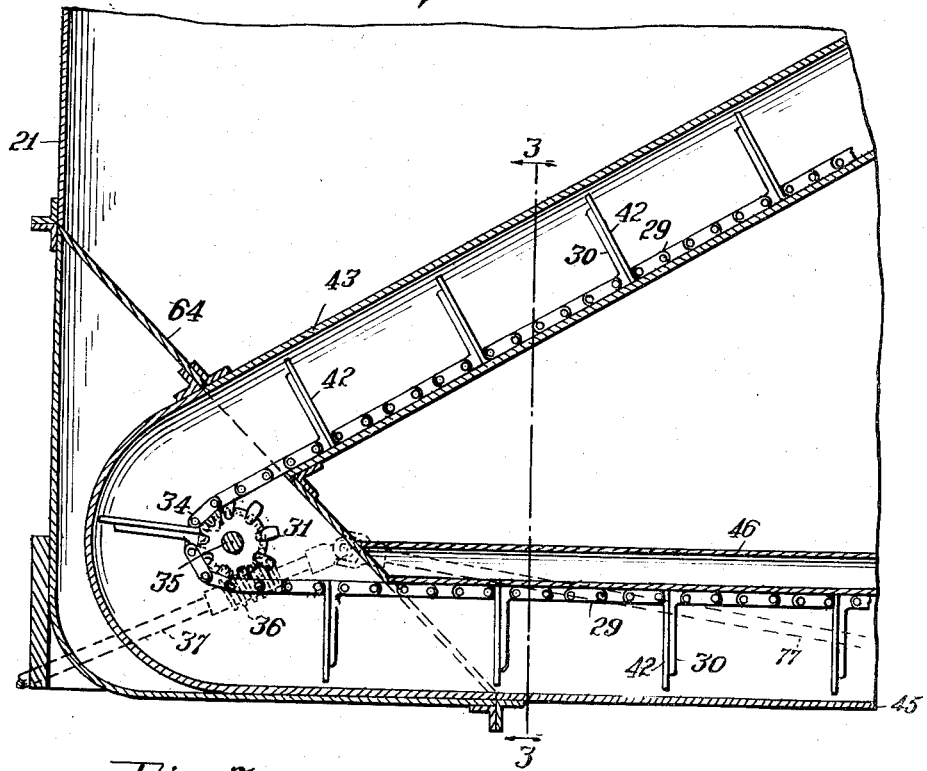
Figure 3:
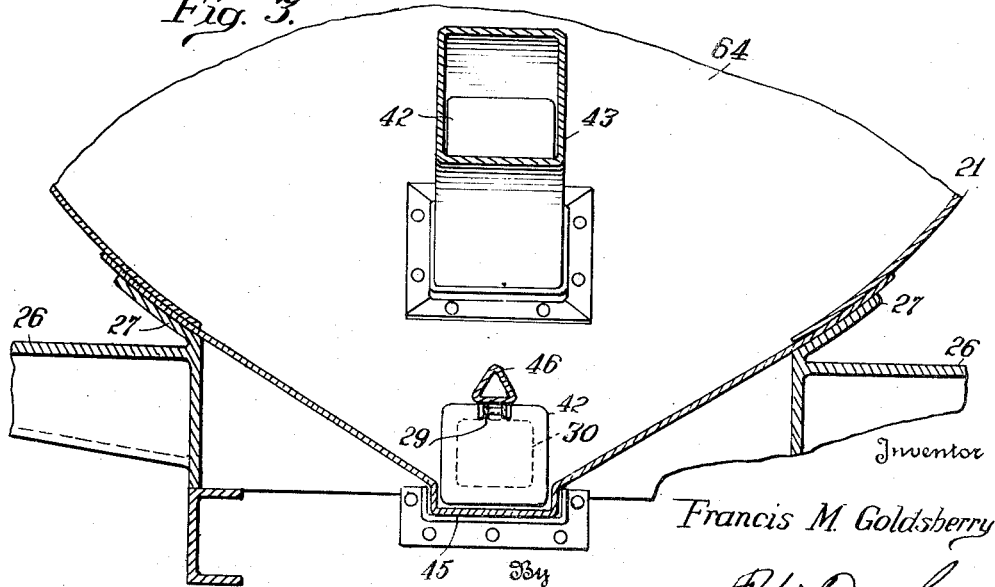

Referring to the drawings, which are made a part of this application and in which similar reference characters indicate similar parts:

Fig. 1 is a longitudinal central section of the device of my invention,

Fig. 2, an enlarged view of the parts shown at the left end of Fig. 1,

Fig. 3, a section on line 3—3 of Fig. 2,

Fig. 4, an enlargement of parts shown at the right end of Fig. 1, with certain parts differently positioned, Fig. 5, a section on line 5—5 of Fig. 4, Fig. 6, a section on line 6—6 of Fig. 5, Fig. 7, a top plan with parts omitted, Fig. 8, a detail of gearing shown in Fig. 1, Fig. 9, a transverse section on line 9—9 of Fig. 1, and with the distributing conveyor in an operative position, Figs. 10 and 11, details of gate operating means shown in Fig. 9, Fig. 12, a transverse section of gate operating mechanism of a modified form, such as may be used in the middle compartment of a truck such as shown in Fig. 1, Fig. 13, a cross-section of another form of gate operating means, suitable for use, for example, in the rear compartment of a truck such as that of Fig. 1, Fig. 14, a detail of the upper parts of the gate operating means of Figs. 12 and 13, Fig. 15, a partial side elevation of a sprocket gear used in the truck disclosed herein, Fig. 16, a longitudinal section of the same, and Fig. 17, a side elevation of the adjusting mechanism for the sprocket gearing.

In the drawings, reference character 20 indicates generally a truck on which is carried a tank 21 that is provided with partitions 22, 23, in any suitable number, which are rigidly secured in place, and which divide the tank into compartments of desired number so that they may contain different materials if desired. Each compartment is shown as having a top opening for filling the same, said opening being provided in a neck 24 and being closed by a lid 25. For reasons that will appear hereinafter the rear compartment has two laterally-spaced openings that are closed by two lids 25.

The tank 21 is of generally cylindrical shape and, as best shown in Figs. 9, 12 and 13, it is rigidly held in place upon the body 26 of the truck, as by means of flanges 27 welded to the tank, the tank extending downward between two side parts of the body which are flat at the top and offer a substantial surface for supporting sacks of material or other articles for transportation. These side parts are raised at their outer edges, as at 28, 28, to aid in holding such articles against accidentally falling off their support.

The means for emptying the compartments comprises two endless conveyors of push plate type, having transverse plates or cleats: to wit, a main conveyor in the tank and having a chain 29 with cleats 30 riveted or otherwise rigidly fixed to spaced links of special shape, so that the cleats are held always at right-angles to said links of the chain. The chain passes about sprockets 31, 32 and 33, in a path that is a right triangle with a short upright leg and a longer base. Said sprocket, which drives the chain is at the most acute angle of the triangle so that the chain is wrapped about the greater part of the circumference of that sprocket to engage a large number of its teeth with the links of the chain. Said sprocket is driven from the motor of the truck by means of a worm wheel 34 (Figs. 1 and 8) on the same shaft 35 with the sprocket 31, the worm wheel being driven by a worm 36 on a shaft 37 connected to any suitable take-off 39 of the motor by a universal joint 38. Sprocket 33 is an idler and sprocket 32 is also an idler that is adjustable by means of a bolt 40 and a nut 41 to tighten the conveyor chain.

The paddles or cleats of the conveyor are made of or reinforced with steel, and faced with leather or other flexible sheet material, as indicated at 42 (Fig. 2) which sheet material projects beyond the body of the cleat so as to wipe the surrounding parts clean of material, as well as to reduce the noise and because it increases the life of the cleats. The main conveyor includes a lower horizontal run, a vertical run and an inclined run supported at spaced intervals by partitions 22 and 23, the two latter runs being enclosed in trunks 43, 44 and the lowermost run lying in an open-topped track 45 formed in the bottom of the tank or affixed thereto.

For protecting the lowermost run of the conveyor from the weight of the fluent material above it, there is provided a guard 46 which may be made of any suitable width less than the length of the cleats and which prevents the cleats from being forced up by the fluent material while the conveyor is in operation. It also serves as a shield to keep the material out of the chain, and tends to keep the cleats at the bottom of the conveyor trough. The length of the cleats should be so limited with respect to the width of the guard that the cleats project at their upper corners into the material that is being unloaded, thus stirring it so as to prevent bridging and causing an even flow to occur until the compartment is empty, the last portions of the material being swept out by reason of the leather facing of the cleats, which fits closely against the floor of the tank between the sides of the track 45 and into the inner corners at opposite sides of said track.

All the compartments except the front one in the tank shown in the drawings are provided with gates, so that the front compartment must be unloaded first, while the other compartments can be unloaded selectively, either wholly or in part, such gates being shown at 47 in Fig. 9 in full lines in their fully closed position and in dotted lines in an open position, they being supported when in closed position by flanges 48, 48 extending from the partitions 22 and 23. The gates are so designed as to break up or loosen any packed material as they are being raised, so as to make it flow freely.

For raising and lowering the gates 47 I provide means at each end thereof so that either end can be raised to vary the feed or to break up packed material, though usually a pair of gates will be raised equally at both ends, such means being sheltered against the material in the compartments by hoods indicated at 49 and 50, the hoods 49 being fixed to partitions 22 and 23, respectively. The arrangement in Fig. 1 comprises shafts 51 at each end of the gates in the middle and rear compartments, the shafts being threaded adjacent one end, as at 52, and being mounted for rotation and oscillation with respect to a reinforcing plate 53 welded to the wall of the tank. The shaft has a nut 54 welded to it inside said wall and a nut 55 pinned to it outside the wall, the hole in the plate 53 being of sufficient size to permit slight oscillation of the shaft. At its inner end the shaft is threaded to a trunnion 56 that is pivoted at 57 to one arm of a bell crank lever 58 pivoted at 59 on one of the hoods 49 and 50, the other arm of said lever being pivoted at 60 to a trunnion 60' connected to a link 61 having at its lower end a collar 62 to which the gates are pivoted. The shaft 51 can be rotated by rotation of a crank 63 having a recess fitting over the nut 55, said crank being removable for actuating any of the shafts of the several gates of the different compartments, to lift them to such a position for example as that indicated in dotted lines in Fig. 9. The rear ends of gates 47 in the rear compartment terminate in oblique rear ends, so as to fit tight against a sprocket guard now to be described.

The sprockets 31 and 33 are protected against access of material from the interior of the tank, which might interfere with their operation, by means of guards of sheet metal or the like affixed to the walls of the tank, as shown at 64 and 65, and the sprocket 32 which is outside the tank is similarly protected by a sheet-metal guard 66 against the intrusion of material or objects that might interfere with its operation.

At the upper end of the trunk 43 there is a flat-sided casing head 67 guiding the main conveyor about the angle between trunks 43 and 44 and projecting rearwardly and downwardly to guide the material being conveyed to a second flat-sided conveyor head 68 connected to head 67 by means of a flanged collar 69 welded to head 68 and bolted to the tubular lower end of head 67. Another flanged collar 70 is welded to head 67 and a split coupling collar 71 having upper and lower flanges straddles the flanges of said flanged collars, the halves of the coupling collar being held in place by bolts in holes 71'. The heads can thus rotate freely with respect to one another.

The head 68 carries a casing 72 for a discharge conveyor consisting essentially of an endless chain 73 carrying plates 74 that may be of the same construction as the plates of the main conveyor, said conveyor being swingable laterally from the solid line position of Fig. 7 to either of the opposite dotted line posistions for discharging to one side or the other of the truck, or to any intermediate position. Said chain is trained about a pair of sprockets 75, 76 and is driven from the motor of the truck by means comprising a shaft 77 (Fig. 8) connected by a universal joint 78 to the shaft 37; a second universal joint 79 connecting the shaft 77 to a shaft 80 carrying a worm (not shown) geared to a worm wheel 81, a worm wheel shaft 83, an intermediate shaft 82, universal joints 84, 85 at opposite ends of shaft 82, and a shaft 86 connecting the universal joint 85 to a shaft 86 provided with a bevel pinion 87 meshing with a bevel gear 88 on a shaft 89 on which sprocket 75 is mounted.

The discharge conveyor may be moved manually from one lateral position to another but since it should be in lowered position as in Fig. 5 during transportation, mechanism is provided for raising it and holding it in any desired raised position while unloading. Such means comprises a cable 90 fastened at one end to the free end of the casing 72 (Fig. 9) at 91 and at the other end passing between guide rollers 92, over a guide pulley 93 to a reel 94 operated by a worm wheel 95 and a worm 96 actuated by a crank 97 or by other suitable means. The reel and its operating means are carried by a saddle 98 on top of the casing 67, while the guide rollers 92 and 93 are supported on a housing 99 pivotally mounted at 100 for oscillation in a vertical plane on a bracket 101 that is in turn mounted on a pivot 102 for oscillation in a horizontal plane. The pivot 102 passes through a base plate 103 that is fixed to the saddle 98 and has depending flanges at 104, to which the base plate is welded, said plate also carrying the reel 94 and associated parts. The vertical swinging of housing 99 is desirable when the outer end of casing 72 is lifted above the horizontal, as for feeding into an elevated bin or other container.

The secondary or distributing conveyor and its casing can be swung laterally for unloading either directly behind the truck or at any point about its rear end between the two dotted line positions illustrated in Fig. 7, which may be considered approximately the extreme possible positions. Now in order that the casing or trunk 72 may be swung from its inactive lowered position to such operative positions as that shown in Fig. 1, the second head is rounded at the rear concentrically with shaft 89 and is provided at its rear side with a slot in which the casing 72 can swing up and down, the rear end of the casing being rounded as shown at 105 to fit into the rounded wall of the head 68, and the head together with casing 72, the distributing conveyor and associated movable parts all swinging about shaft 89 as a pivot.

The slot is closed in all positions of the distributor by means of a flexible cover 106 of cloth or the like secured at one end to the upper part of head 68 by a clip 107 and passing thence over the rounded adjacent part of the head, then under a guide roller 108 that holds it closely against the said head, and then along the casing to a small casing 109 for a spring that holds the cover taut, the spring winding itself upon any suitable rotary core as the distributor casing is moved upward and being unwound to let the cover out as the said casing swings downward toward the position of Fig. 4. This cover prevents dust from coming out of the slot, and prevents entry of foreign bodies of any sort.

An important feature of my invention is the shape of the sprocket teeth on sprockets 31, 32 and 33, which, though protected from the load of material in the tank, are yet exposed to engagement by loose grain or other material that is being unloaded by the conveyor, and so are liable to load up and throw off the chain. The sprockets may each have a two-part body 110, 111 upon which there is welded an annulus 112 that is or may be integral with the teeth 113. I provide machined recesses at 114 at each side of the gear between each pair of teeth in the circle, thus permitting the fluent material which otherwise would load up and throw the chain to escape at either side of the annular flange on which the teeth are formed.

In a modified form of gate-operating means, illustrated in Figs. 12 to 14, an intermediate compartment is provided with gates as before described, but the gates are operated from the top of the tank by means of a crank having a socket fitting on a nut 116 that is pinned or otherwise secured to a bolt 117 passing through the upper wall of the tank and having a head 118 to which is welded the upper end of a sleeve 119 having welded thereto at a lower point another nut 120 having an internal thread engaging with a thread on a rod 121 that has an offset at 122 passing around the trunk 43 so as not to interfere therewith. Rotation of the crank 115 will obviously merely move the rod 121 endwise and without rotating the same. The sleeve 119 extends a substantial distance below the nut 120 to keep fluent material in the tank away from the nut 120. It will be noted that two inlet covers 123, 124 are provided in Fig. 12, the gate operating means external to the tank being located between the two covers, as in the case of the rear compartment of Fig. 1.

In the form of the invention illustrated in Fig. 13, the gate operating means comprises a straight rod that may be moved endwise by means such as shown in Figs. 12 and 13. In this case it is not feasible to use a crooked rod, as in said figures, since this gate operating means is intended for use where the trunk is close to the top of the tank, either inside or outside the same. In order to insure that the gates will be moved approximately straight upward and downward there is provided a guide for the rod 127 engaging with one side of the rod 125 for holding it against sidewise movement. Here again there will be two covers 128, 129 for the two inlet openings at opposite sides of the main conveyor.

For purposes of illustration it may be stated that a tank such as used by me has a tank 16 feet long with a capacity of 6½ tons of mixed dairy feed and it can be unloaded in a maximum of 22 minutes where the entire contents are discharged at the same place, as in loading box cars. It is also possible to carry 1,000 pounds of sacked feed on the sack platforms alongside the tank, for distribution in small amounts, as an auxiliary to the hauling of the main load, which main load may be unloaded at one place or may be distributed in desired amounts at any number of points.

It will be obvious to those skilled in the art that many changes may be made in the devices herein disclosed, all without departing from the spirit of the invention; and, therefore, I do not limit myself to what is shown in the drawings and described in the specification, but only as indicated in the appended claims.

I claim:

1. In a bulk tank truck, a tank having a longitudinal runway at its bottom, conveying means in said runway, a pair of gates extending lengthwise of the tank over said conveying means, means for supporting said gates in edge contact and in angularly related position over said conveying means, means for opening said gates, partitions between the compartments and means on said partitions for shielding the gate lifting means from the contents of the tank.

2. A bulk tank truck comprising a tank, a conveyor for transporting material from the interior of the tank to a point above its rear end, a discharge conveyor, conveyor heads for the respective conveyors, swivel connections for said heads including parallel annular flanges rigid with said heads at their adjacent ends, and a split collar detachably connecting said flanges.

3. A bulk tank truck comprising a tank, a main conveyor for moving material from the interior of the tank to a point outside the same, a discharge conveyor positioned to receive the material from the main conveyor, a head for the main conveyor, said head having walls continuous with those of the tank and having an outlet for said material, a casing for the discharge conveyor, a head for said casing, said head having an inlet registering with the outlet for the main conveyor, a swivel connection between said heads including parallel annular flanges at adjacent ends of said heads, and a split collar detachably connecting said flanges.

4. A bulk tank truck comprising a tank, a main conveyor for moving material from the interior of the tank to a point outside the same, a discharge conveyor positioned to receive the material from the main conveyor, a head for the main conveyor, a casing for the discharge conveyor, a head for the casing, said head being pivoted to the first-named head for pivotal movement in a vertical plane through a slot in said first-named head, and a flexible cover arranged to close said slot in all positions of the discharge conveyor.

5. A bulk tank truck comprising a tank, a distributing conveyor at the rear end of the truck, means for supplying material from the interior of the truck to the conveyor, means for supporting the conveyor for pivotal lateral and vertical movement, including a cable connected to the free end of the conveyor supporting means, winding means above the tank, a spar extending rearwardly from the winding means, means supporting said spar for lateral and vertical pivotal movement, and means on the spar for guiding the cable to the winding means.

6. A bulk tank truck having a tank, a longitudinal runway in the bottom of the tank, sprockets at the ends of the runway, a sprocket at the upper rear end of the tank, an endless conveyor comprising a chain trained about said sprockets in a right triangle providing a short descending run, a longer lower horizontal run at right angles to said descending run, and plates on said chain depending into said runway, a casing enclosing said diagonal run, and an outlet in the casing rearwardly of and below the sprocket at the upper rear end of the tank, the chain making a right angle turn about the sprocket at the lower end of the descending run, an acute angle turn at the upper end of said run, and a still more acute angle turn about the sprocket at the front end of the lower run, said last-named sprocket being the drive sprocket for the conveyor.

7. In a bulk tank truck, a tank having a longitudinal runway at the bottom, an endless conveyor having transverse cleats and having a run in said runway, a pair of gates connected along one edge and arranged in parallelism with said run, inverted V-shaped guides supporting said gates for covering said run, and means for lifting said gates at either end independently of the other end to admit material from the tank to said run.

8. In a bulk tank truck, a tank having a longitudinal runway at the bottom, conveying means in said runway, a pair of gates extending lengthwise of the tank over said conveying means, means for supporting said gates in edge contact and in angularly related position over said conveying means, and means for lifting the gates to admit material to the conveying means, the lifting means comprising an approximately horizontal shaft extending through the wall of the tank, and means to rotate the shaft and thus to lift the gates.

9. A device as in claim 8, including an inverted trough over said shaft to protect it from the contents of the tank.

10. In a bulk tank truck, a tank having a longitudinal depressed runway along its bottom, sprockets at opposite ends of the runway, an endless conveyor comprising a chain running over said sprockets, push plates depending from said chain into said runway, a pair of gates adapted to cover said conveyor, said gates being pivotally connected along a line parallel to said runway, and a narrow guard extending along the runway between the chain and the gates, said guard being of sufficient width to cover the chain.

11. A device as in claim 10, wherein the guard is at least equal in width to the chain, but is narrower than the length of the plates.

12. A device as in claim 10 wherein the guard is at least as wide as the chain and tapers upward therefrom.

13. A bulk tank truck comprising a tank, a conveyor including an endless chain having a run extending diagonally from the lower front end of the tank to the upper rear thereof, then about a sprocket at an acute angle and downward to the bottom of the tank, plates extending from a face of the chain, a casing for the conveyor having an enlarged chamber to receive material thrown off at the upper end of the diagonal run by centrifugal force, an outlet at the lower end of the chamber remote from said sprocket, a head having an inlet registering with said outlet and being rotatable with relation to said outlet, a horizontal shaft carried by said head, a casing having an end fitting in the head for oscillation about said shaft, and a delivery conveyor in said casing.

14. A device as in claim 13, the delivery conveyor being endless, and said shaft having driving connection with the delivery conveyor.

15. A bulk tank truck having a tank, an endless conveyor in said tank, said conveyor having a horizontal lower run, an inclined run extending from the lower front end of the tank to the upper rear end and a return run, a casing for the conveyor having an enlarged upper chamber to receive material discharged from the inclined run, an outlet at the lower end of the chamber, a head swivelly connected to said chamber for rotation about said outlet as an axis, a horizontal shaft on said head, a casing pivoted on said shaft, said casing and said head having interfitted rounded ends concentric with said shaft, an endless delivery conveyor in said last-named casing, and driving connections between said delivery conveyor and said shaft, said rotary head substantially closing the space between said conveyors to prevent loss of material in transit.

16. A truck comprising a tank, transverse partitions dividing the interior of the tank into separate compartments, an endless conveyor having a lower run in a groove in the floor of the tank, means for selectively unloading compartments into said groove, an enclosed upright conduit at one end of the tank for a vertical run of the conveyor, a diagonal enclosed conduit extending through said partitions for guiding said conveyor from the floor level to the upper end of the upright conduit, means on the partitions for supporting the diagonal conduit, and an outlet at the upper end of the diagonal conduit.

17. A truck for hauling fluent solids and the like comprising a tank, partitions extending transversely of the tank and dividing the same into separate compartments, an endless conveyor of the push plate type having a horizontal run in a groove in the floor of the tank, a diagonal conduit for an ascending run of the conveyor supported by said partitions and extending from one end of said groove to the upper portion of the opposite end of the tank, and an outlet from the tank at the upper end of the diagonal conduit.

18. A truck as in claim 17, wherein the conveyor comprises an endless chain, sprockets at opposite ends of said groove about which sprockets said chain passes, rigid push plates extending downward from the lower run of the chain into said groove, and flexible facings on said push plates bearing against the bottom and sides of said groove.

19. A device as in claim 17, including means for discharging the contents of the compartments selectively into said groove.

20. The combination of a tank having a groove in its floor, said groove having a horizontal bottom and sides extending upward therefrom, an endless chain type conveyor having pivotally connected links, and push plates individually fixed rigidly to links of the chain, said plates depending from said conveyor into said groove, said plates each comprising a rigid transverse member terminating short of said bottom and sides, and a facing of flexible sheet material secured to a face of said rigid member and extending beyond the same toward the bottom and sides of the groove for sweeping out loose material in said groove.

FRANCIS MERN GOLDSBERRY.

REFERENCES CITED

The following references are of record in the file of this patent:

UNITED STATES PATENTS

| Number | Name | Date |
|---|---|---|
| 1,222,337 | Stuart | Apr. 10, 1917 |
| 1,258,377 | Stuart | Mar. 5, 1918 |
| 1,331,464 | Stuart | Feb. 17, 1920 |
| 1,809,796 | Beardsley et al. | June 9, 1931 |
| 1,889,562 | Moulthrop | Nov. 29, 1932 |
| 1,953,245 | Mackenzie | Apr. 3, 1934 |
| 2,110,262 | Curtis | Mar. 8, 1938 |
| 2,130,099 | Peterson | Sept. 13, 1938 |
| 2,275,799 | Oklejas | Mar. 10, 1942 |
| 2,412,121 | Bradshaw | Dec. 3, 1946 |
| 2,438,301 | Schulte | Mar. 23, 1948 |

FOREIGN PATENTS

| Number | Country | Date |
|---|---|---|
| 553,601 | Germany | June 28, 1932 |
| 824,667 | France | Nov. 18, 1937 |